United States Patent
Hirakawa et al.

(10) Patent No.: US 11,732,088 B2
(45) Date of Patent: Aug. 22, 2023

(54) POLYESTER CARBONATE RESIN AND OPTICAL LENS

(71) Applicant: MITSUBISHI GAS CHEMICAL COMPANY, INC., Tokyo (JP)

(72) Inventors: Manabu Hirakawa, Kanagawa (JP); Noriyuki Kato, Tokyo (JP); Eiichi Honda, Kanagawa (JP); Yasuaki Yoshimura, Kanagawa (JP); Yuichiro Satake, Kanagawa (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 358 days.

(21) Appl. No.: 17/283,747

(22) PCT Filed: Oct. 8, 2019

(86) PCT No.: PCT/JP2019/039690
§ 371 (c)(1),
(2) Date: Apr. 8, 2021

(87) PCT Pub. No.: WO2020/080199
PCT Pub. Date: Apr. 23, 2020

(65) Prior Publication Data
US 2021/0347937 A1  Nov. 11, 2021

(30) Foreign Application Priority Data
Oct. 16, 2018  (JP) .................................. 2018-195283

(51) Int. Cl.
C08G 63/64 (2006.01)
C08G 63/85 (2006.01)
G02B 1/04 (2006.01)

(52) U.S. Cl.
CPC ............ *C08G 63/64* (2013.01); *C08G 63/85* (2013.01); *G02B 1/041* (2013.01)

(58) Field of Classification Search
USPC ......................................... 528/271, 272, 279
See application file for complete search history.

(56) References Cited

U.S. PATENT DOCUMENTS

| | | |
|---|---|---|
| 2015/0285954 A1 | 10/2015 | Ishizuka et al. |
| 2017/0044312 A1 | 2/2017 | Kato et al. |
| 2017/0276837 A1 | 9/2017 | Kato et al. |
| 2018/0305494 A1 | 10/2018 | Satake et al. |
| 2018/0307052 A1 | 10/2018 | Kato et al. |
| 2019/0033489 A1 | 1/2019 | Kato et al. |
| 2019/0119442 A1 | 4/2019 | Hirakawa |
| 2020/0190259 A1 | 6/2020 | Kato et al. |
| 2020/0224025 A1 | 7/2020 | Hirakawa et al. |

FOREIGN PATENT DOCUMENTS

| | | |
|---|---|---|
| EP | 3 141 570 A1 | 3/2017 |
| JP | 02-069520 A | 3/1990 |
| JP | 05-070584 A | 3/1993 |

(Continued)

OTHER PUBLICATIONS

Extended European Search Report issued in corresponding European Patent Application No. 19874681.0 dated Oct. 27, 2021.

(Continued)

*Primary Examiner* — Terressa Boykin
(74) *Attorney, Agent, or Firm* — Greenblum & Bernstein, P.L.C.

(57) ABSTRACT

A polyester carbonate resin is provided and includes a constituent unit represented by the following general formula (1), a constituent unit represented by the following general formula (2), and a constituent unit represented by the following general formula (3):

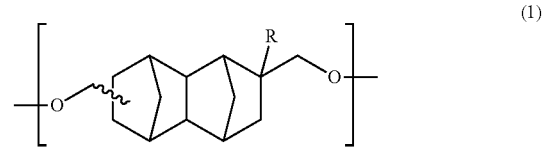

(1)

wherein R represents hydrogen or an alkyl group containing 1 to 4 carbon atoms,

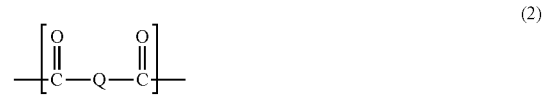
(2)

wherein Q represents the following:

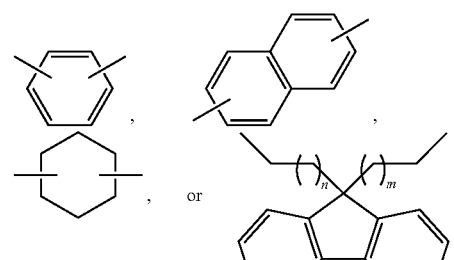

wherein n and m each independently represent an integer of 0 to 5, and (Continued)

(3)

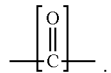

7 Claims, No Drawings

(56) References Cited

FOREIGN PATENT DOCUMENTS

| | | |
|---|---|---|
| JP | 05-155964 A | 6/1993 |
| JP | 05-341124 A | 12/1993 |
| JP | 2007-161917 A | 6/2007 |
| JP | 2017-179323 A | 10/2017 |
| WO | 2014/073496 A1 | 5/2014 |
| WO | 2016/052370 A1 | 4/2016 |
| WO | 2017/047555 A1 | 3/2017 |
| WO | 2017/078074 A1 | 5/2017 |
| WO | 2017/175693 A1 | 10/2017 |
| WO | 2018/181157 A1 | 10/2018 |

OTHER PUBLICATIONS

Office Action issued in the corresponding Chinese Patent Application No. 20198006597.X dated Jul. 12, 2022, along with English translation thereof.

International Search Report issued in International Patent Application No. PCT/JP2019/039690, dated Dec. 17, 2019, along with an English translation thereof.

Written Opinion of the International Searching Authority issued in International Patent Application No. PCT/JP2019/039690, dated Dec. 17, 2019, along with an English translation thereof.

POLYESTER CARBONATE RESIN AND OPTICAL LENS

TECHNICAL FIELD

The present invention relates to a novel polyester carbonate resin, and an optical lens formed from the polyester carbonate resin. In addition, the present invention relates to an optical lens excellent in at least one of orientation birefringence, photoelastic coefficient, glass transition temperature, and refractive index.

BACKGROUND ART

As materials for optical elements used in the optical systems of various types of cameras, such as a camera, a film-integrated camera and a video camera, optical glasses or optical transparent resins have been used. As such optical glasses, many types of materials that are excellent in heat resistance, transparency, dimensional stability, chemical resistance and the like, and have various refractive indexes (nD) or Abbe numbers (vD) have existed. However, these optical glasses have been problematic in terms of high material costs, poor formability and low productivity. In particular, since the processing of the optical glasses into aspherical lens used in aberration correction requires extremely high techniques and high costs, which cause major obstacles for the practical use thereof.

On the other hand, an optical lens consisting of an optical transparent resin, in particular, a thermoplastic transparent resin, is advantageous in that it can be produced in a large amount by injection molding, and also in that an aspherical lens can be easily produced from the optical lens. At present, such optical lenses have been used as lenses for cameras. Examples of the optical transparent resin may include polycarbonate consisting of bisphenol A, polystyrene, poly-4-methylpentene, polymethyl methacrylate, and amorphous polyolefin.

However, when the optical transparent resin is used as an optical lens, it is disadvantageous in that its using position is limited by the characteristic balance of the resin because the optical transparent resin is required to have transparency, heat resistance and low birefringence, as well as refractive index and Abbe number. For example, polystyrene has low heat resistance and high birefringence; poly-4-methylpentene has low heat resistance; and polymethyl methacrylate has low glass transition temperature, low heat resistance, and small refractive index. Thus, the using regions of these resins are limited. Polycarbonate consisting of bisphenol A is disadvantageous in terms of high birefringence, etc., and thus, its using position is unfavorably limited.

Meanwhile, in general, if the refractive index of an optical material is high, a lens element having the same refractive index can be realized at a surface having a smaller curvature. Hence, the aberration amount generated at this surface can be reduced, and the downsizing and lightening of the lens system can be achieved by a reduction in the number of lenses, a reduction in the eccentric sensitivity of the lens, and a reduction in the thickness of the lens. Accordingly, the achievement of a high refractive index is useful.

Moreover, in the optical design of optical units, it has been known that chromatic aberration is corrected by the combined use of a plurality of lenses having each different Abbe number. For example, a lens made of an alicyclic polyolefin resin having an Abbe number of 45 to 60 is combined with a lens made of a polycarbonate (nD=1.59, vD=29) resin consisting of bisphenol A having a low Abbe number, so as to correct chromatic aberration.

Examples of an optical transparent resin practically used for optical lenses, which has a high Abbe number, may include polymethyl methacrylate (PMMA) and a cycloolefin polymer. In particular, since the cycloolefin polymer has excellent heat resistance and excellent mechanical properties, it has been widely used for optical lenses.

Examples of a resin having a low Abbe number may include polyester and polycarbonate. For example, the resin described in Patent Literature 1 is characterized in that it has a high refractive index and a low Abbe number.

There is a difference in water absorption expansion rate between a cycloolefin polymer having a high Abbe number and a polycarbonate resin that is a polymer having a low Abbe number. If the lenses produced from the above two types of polymers are combined with each other to form a lens unit, a difference is generated in the size of lenses when a smart phone or the like absorbs water in the usage environment. This expansion rate difference causes damage to the performance of lens.

Patent Literatures 2 to 4 disclose a polycarbonate polymer comprising a perhydroxy dimethanonaphthalene skeleton. Since all of the dihydroxymethyl groups are located at positions 2 and 3, this polycarbonate polymer has low strength and is not suitable for use in optical lenses. Furthermore, since the polycarbonate disclosed in Patent Literatures 2 to 4 has a low glass transition temperature (Tg), it is problematic in terms of heat resistance. For example, the HOMO polycarbonate described in Example 1 of Patent Literature 4 has a low glass transition temperature (Tg) of 125° C., although it has a number average molecular weight of 38000.

PRIOR ART DOCUMENTS

Patent Documents

Patent document 1: International Publication WO2014/73496

Patent document 2: Japanese Patent Laid-open Publication No. H05-70584 (1993)

Patent document 3: Japanese Patent Laid-open Publication No. H02-69520 (1990)

Patent document 4: Japanese Patent Laid-open Publication No. H05-341124 (1993)

SUMMARY OF THE INVENTION

Problems to be Solved by the Invention

It is an object of the present invention to solve at least one of the above-described problems of the prior art techniques. Moreover, in a preferred aspect of the present invention, it is another object of the present invention to provide a polyester carbonate resin excellent in at least one of orientation birefringence, photoelastic coefficient, glass transition temperature, and refractive index. Furthermore, it is a further object of the present invention to provide an optical lens produced from this resin.

Means for Solving the Problems

As a result of intensive studies directed towards achieving the aforementioned objects, the present inventors have found that a polyester carbonate resin having decahydro-1, 4:5,8-dimethanonaphthalenediol (D-NDM) as a raw material can achieve the aforementioned objects, thereby completing the present invention.

That is to say, the present invention relates to a polyester carbonate resin as described below, and an optical lens in which the polyester carbonate resin is used.

<1> A polyester carbonate resin comprising a constituent unit represented by the following general formula (1), a constituent unit represented by the following general formula (2), and a constituent unit represented by the following general formula (3):

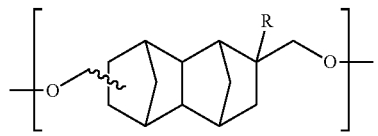

(1)

wherein R represents hydrogen or an alkyl group containing 1 to 4 carbon atoms,

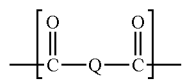

(2)

wherein Q represents the following:

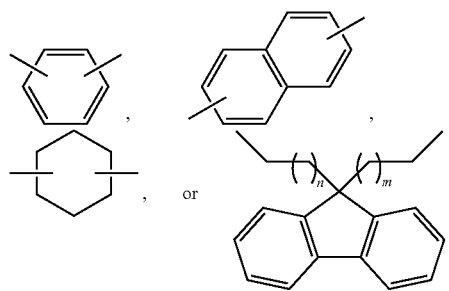

wherein n and m each independently represent an integer of 0 to 5, and

(3)

<2> The polyester carbonate resin according to the above <1>, further comprising a constituent unit represented by the following general formula (4):

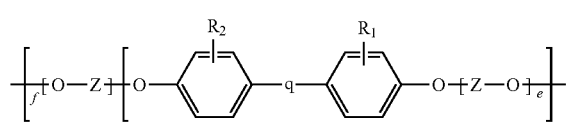

(4)

wherein q represents the following, and $R_1$ and $R_2$ each independently represent hydrogen, a methyl group, or an aryl group, Z represents an alkylene group containing 1 to 8 carbon atoms, and e and f each independently represent an integer of 0 to 10,

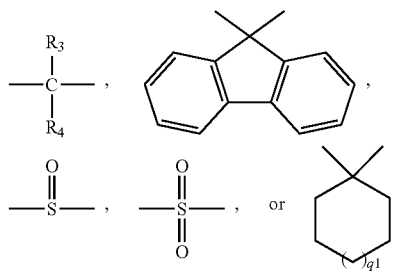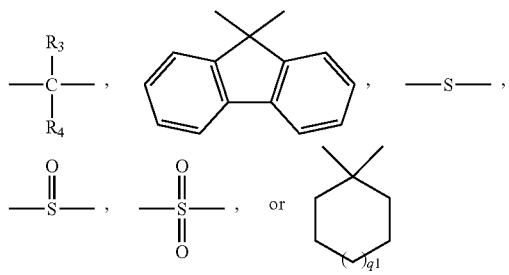

wherein $R_3$ and $R_4$ each independently represent hydrogen, an optionally branched alkyl group containing 1 to 5 carbon atoms, or an aryl group, and q1 represents an integer of 1 to 12.

<3> The polyester carbonate resin according to the above <1> or <2>, further comprising a constituent unit represented by the following general formula (5):

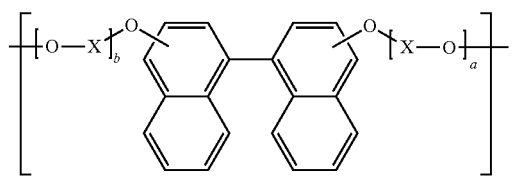

(5)

wherein X represents an alkylene group containing 1 to 8 carbon atoms, and a and b each independently represent an integer of 0 to 10.

<4> The polyester carbonate resin according to the above <1> or <2>, further comprising a constituent unit represented by the following general formula (6):

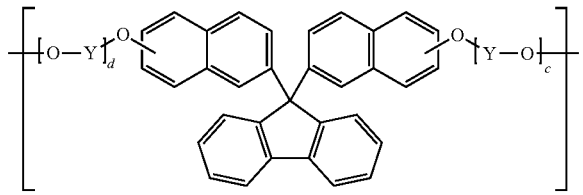

(6)

wherein Y represents an alkylene group containing 1 to 8 carbon atoms, and c and d each independently represent an integer of 0 to 10.

<5> An optical lens, in which the polyester carbonate resin according to any one of the above <1> to <4> is used.

Advantageous Effect of the Invention

According to a preferred aspect of the present invention, a polyester carbonate resin excellent in at least one of orientation birefringence, photoelastic coefficient, glass transition temperature, and refractive index, can be obtained. Further, an optical lens produced from this resin can be obtained.

EMBODIMENTS FOR CARRYING OUT THE INVENTION (A) Polyester Carbonate Resin

The polyester carbonate resin of the present invention comprises a constituent unit represented by the following general formula (1) (hereinafter referred to as "constituent unit (1)"). An example of the constituent unit (1) may be a constituent unit derived from decahydro-1,4:5,8-dimethanonaphthalenediol (which is also referred to as "D-NDM"). As described later, the constituent unit (1) is obtained, for example, by reacting a diol compound represented by formula (I) as shown later with a carbonic acid diester.

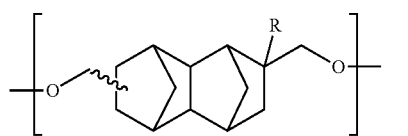
(1)

In the general formula (1), R represents hydrogen or an alkyl group containing 1 to 4 carbon atoms, and R preferably represents hydrogen.

The polyester carbonate resin of the present invention comprises a constituent unit represented by the following general formula (2) and a constituent unit represented by the following general formula (3), in addition to the constituent unit (1).

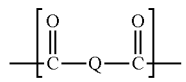
(2)

In the general formula (2), Q represents the following:

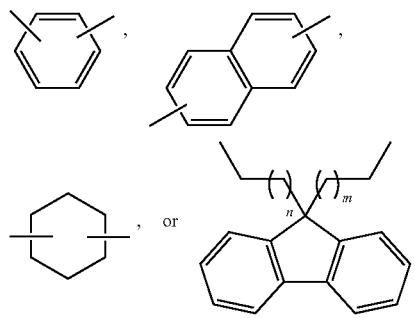

wherein n and m each independently represent an integer of 0 to 5.

(3)

In the general formula (2), Q preferably represents the following:

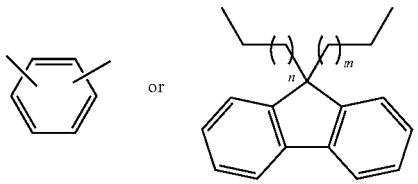

Further, in the general formula (2), Q more preferably represents the following:

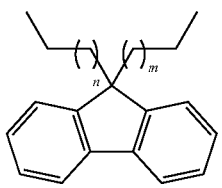

With regard to the molar ratio between the constituent unit represented by the above general formula (1) and the constituent unit represented by the above general formula (2), the constituent unit represented by the general formula (1): the constituent unit represented by the general formula (2) is preferably 90:10 to 10:90, more preferably 85:15 to 50:50, further preferably 80:20 to 50:50, and particularly preferably 80:20 to 60:40. If the molar ratio of the constituent unit represented by the above general formula (2) is smaller than the above-described range, the crystallinity of the polyester carbonate resin increases, so that whitening and embrittlement would easily occur due to crystallization upon the forming of a molded body. In contrast, if the molar ratio of the constituent unit represented by the above general formula (2) is larger than the above-described range, the orientation birefringence or photoelastic coefficient of the polyester carbonate resin becomes excessively high when the resin is used for optical purposes such as an optical lens, and as a result, the fluidity of the resin would decrease upon the melt molding thereof.

On the other hand, with regard to the molar ratio between the constituent unit represented by the above general formula (1) and the constituent unit represented by the above general formula (3), the constituent unit represented by the general formula (1):the constituent unit represented by the general formula (3) is preferably 70:30 to 30:70, more preferably 60:40 to 40:60, and particularly preferably 55:45 to 45:55. If the molar ratio of the constituent unit represented by the above general formula (3) is smaller than the above-described range, the molecular weight is not increased and unreacted monomers remain in the resin, so that the strength of the obtained molded body may be decreased, or hydrolysis resistance may be decreased. In contrast, if the molar ratio of the constituent unit represented by the above general formula (3) is larger than the above-described range, the molecular weight is not increased and unreacted monomers remain in the resin, so that the strength of the obtained molded body may be decreased, or a metal mold may easily become dirty upon the molding.

The polyester carbonate resin of the present invention may not only be a resin consisting only of the constituent unit represented by the above general formula (1), the constituent unit represented by the above general formula (2), and the constituent unit represented by the above general formula (3), but it may also comprise other constituent units.

Preferred examples of such other constituent units may include a constituent unit represented by the following general formula (4), a constituent unit represented by the following general formula (5), and a constituent unit represented by the following general formula (6).

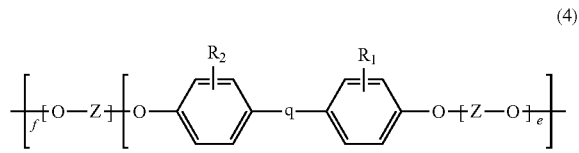
(4)

In the general formula (4), q represents the following; $R_1$ and $R_2$ each independently represent hydrogen, a methyl group, or an aryl group, and preferably represents hydrogen or a phenyl group; Z represents an alkylene group containing 1 to 8 carbon atoms, preferably represents an alkylene group containing 1 to 3 carbon atoms, and particularly preferably an ethylene group; and e and f each independently represent an integer of 0 to 10, preferably represent an integer of 0 to 3, and particularly preferably represent 1.

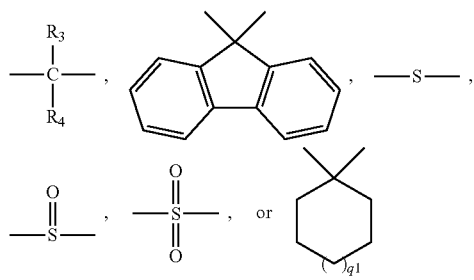

wherein $R_3$ and $R_4$ each independently represent hydrogen, an optionally branched alkyl group containing 1 to 5 carbon atoms, or an aryl group, and preferably represents a methyl group; and q1 represents an integer of 1 to 12, preferably represents an integer of 1 to 7, and particularly preferably represents 1.

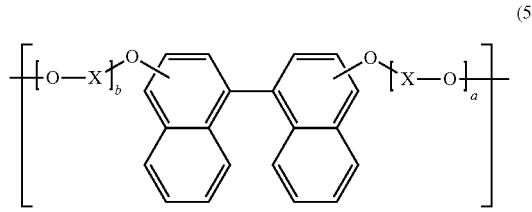
(5)

In the general formula (5), X represents an alkylene group containing 1 to 8 carbon atoms, preferably represents an alkylene group containing 1 to 3 carbon atoms, and particularly preferably represents an ethylene group; and a and b each independently represent an integer of 0 to 10, preferably represent an integer of 0 to 3, and particularly preferably represent 1.

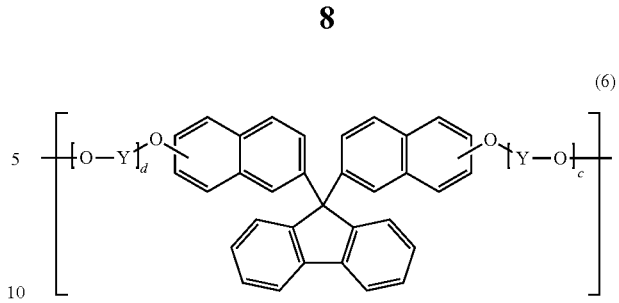
(6)

In the general formula (6), Y represents an alkylene group containing 1 to 8 carbon atoms, preferably represents an alkylene group containing 1 to 3 carbon atoms, and particularly preferably represents an ethylene group; c and d each independently represent an integer of 0 to 10, preferably represent an integer of 0 to 3, and particularly preferably represent 1.

With regard to the molar ratio between the constituent unit represented by the above general formula (1) and the constituent unit represented by the above general formula (4), the constituent unit represented by the general formula (1): the constituent unit represented by the general formula (4) is preferably 50:50 to 100:0, more preferably 50:50 to 95:5, and particularly preferably 70:30 to 95:5. When the molar ratio of the constituent unit represented by the above general formula (4) is within the above-described range, the value of the orientation birefringence can be favorably decreased.

Moreover, with regard to the molar ratio between the constituent unit represented by the above general formula (1) and the constituent unit represented by the above general formula (5), the constituent unit represented by the general formula (1):the constituent unit represented by the general formula (5) is preferably 50:50 to 100:0, more preferably 50:50 to 95:5, and particularly preferably 70:30 to 95:5. When the molar ratio of the constituent unit represented by the above general formula (5) is within the above-described range, the value of the orientation birefringence can be favorably decreased.

Furthermore, with regard to the molar ratio between the constituent unit represented by the above general formula (1) and the constituent unit represented by the above general formula (6), the constituent unit represented by the general formula (1):the constituent unit represented by the general formula (6) is preferably 50:50 to 100:0, more preferably 50:50 to 95:5, and particularly preferably 70:30 to 95:5. When the molar ratio of the constituent unit represented by the above general formula (6) is within the above-described range, the value of the orientation birefringence can be favorably decreased.

The polyester carbonate resin of the present invention may comprise other constituent units, as well as the above-described constituent units.

An example of such other constituent units may be a constituent unit obtained by reacting a diol compound other than the formula (I) as shown later with a carbonic acid diester. Examples of the diol compound other than the formula (I) may include bisphenol A, bisphenol AP, bisphenol AF, bisphenol B, bisphenol BP, bisphenol C, bisphenol E, bisphenol F, bisphenol G, bisphenol M, bisphenol S, bisphenol P, bisphenol PH, bisphenol TMC, bisphenol Z, 9,9-bis(4-(2-hydroxyethoxy)phenyl)fluorene, 9,9-bis(4-(2-hydroxyethoxy)-3-methylphenyl)fluorene, 9,9-bis(4-(2-hydroxyethoxy)-3-tert-butylphenyl)fluorene, 9,9-bis(4-(2-hydroxyethoxy)-3-isopropylphenyl)fluorene, 9,9-bis(4-(2-hydroxyethoxy)-3-cyclohexylphenyl)fluorene, and 9,9-bis (4-(2-hydroxyethoxy)-3-phenylphenyl)fluorene. Among these, 9,9-bis(4-(2-hydroxyethoxy)-3-phenylphenyl)fluorene is preferable.

The weight average molecular weight (Mw) relative to polystyrene standard of the polyester carbonate resin of the present invention is preferably 5,000 to 300,000. The weight average molecular weight (Mw) relative to polystyrene standard of the present polyester carbonate resin is more preferably 30,000 to 120,000. If Mw is smaller than 5,000, the optical lens unfavorably becomes brittle. In contrast, if Mw is larger than 300,000, melt viscosity becomes high, and thereby it becomes difficult to extract the resin after the production thereof. Further, fluidity becomes deteriorated, so that unfavorably, injection molding is hardly performed in the melted state.

Furthermore, it is preferable to add an antioxidant, a mold release agent, an ultraviolet absorber, a fluidity modifier, a crystal nucleating agent, a reinforcement, a dye, an antistatic agent, an antibacterial agent or the like, to the polyester carbonate resin of the present invention.

In the polyester carbonate resin of the present invention, phenols generated upon production, or carbonic acid diesters that are not reacted and remain, may be present as impurities. The content of the phenols in the polyester carbonate resin is preferably 0.1 to 3000 ppm, more preferably 0.1 to 2000 ppm, and particularly preferably 1 to 1000 ppm, 1 to 800 ppm, 1 to 500 ppm, or 1 to 300 ppm. In addition, the content of the carbonic acid diesters in the polyester carbonate resin is preferably 0.1 to 1000 ppm, more preferably 0.1 to 500 ppm, and particularly preferably 1 to 100 ppm. By regulating the amounts of the phenols and the carbonic acid diesters contained in the polyester carbonate resin, a resin having physical properties suitable for purposes can be obtained. The contents of the phenols and the carbonic acid diesters can be regulated, as appropriate, by changing conditions or devices for polycondensation. Otherwise, the contents of the phenols and the carbonic acid diesters can also be regulated depending on conditions for an extrusion step performed after the polycondensation.

If the contents of the phenols or the carbonic acid diesters exceed the above-described ranges, problems may appear, such as a decrease in the strength of the obtained resin molded body, or generation of odor. On the other hand, if the contents of the phenols or the carbonic acid diesters are lower than the above-described ranges, plasticity is likely to decrease when the resin is melted.

Further, there is a case where the raw material monomers remain in the resin. With regard to the amounts of the raw material monomers remaining in the resin, the amount of each raw material monomer is preferably 3000 ppm or less, and more preferably 1 to 1000 ppm.

(B) Method for Producing Diol Compound Represented by Formula (I)

As described in WO2017/175693, the diol compound represented by the following formula (I) can be synthesized by using dicyclopentadiene or cyclopentadiene and olefin having a functional group as raw materials.

(I)

In the formula (I), R represents hydrogen or an alkyl group containing 1 to 4 carbon atoms, and R preferably represents hydrogen.

(C) Method for Producing Polyester Carbonate Resin

The polyester carbonate resin of the present invention can be produced according to a melt polycondensation method by using the diol compound represented by the formula (I), a compound having an ester skeleton and a carbonic acid diester as raw materials. The diol compound represented by the formula (I) includes a mixture of an isomer substituted at positions 2 and 6 by hydroxymethyl groups and an isomer substituted at positions 2 and 7 by hydroxymethyl groups. With regard to the mass ratio between these isomers, the 2,6-isomer:the 2,7-isomer is 0.1:99.9 to 99.9:0.1. From the viewpoints of the physical properties of the resin, such as the strength and tensile elongation of the resin, and the appearance of the molded body, the 2,6-isomer:the 2,7-isomer is preferably 1.0:99.0 to 99.0:1.0, more preferably 20:80 to 80:20, and particularly preferably 50:50 to 80:20. Furthermore, other diol compounds may be used in combination. In this reaction, the polyester carbonate resin can be produced in the presence of a polycondensation catalyst, namely, in the presence of a basic compound catalyst, a transesterification catalyst, or a mixed catalyst of the basic compound catalyst and the transesterification catalyst.

Examples of the carbonic acid diester may include diphenyl carbonate, ditolyl carbonate, bis(chlorophenyl) carbonate, m-cresyl carbonate, dimethyl carbonate, diethyl carbonate, dibutyl carbonate, and dicyclohexyl carbonate. Among these, diphenyl carbonate is particularly preferable from the viewpoint of reactivity and purity. The carbonic acid diester is used preferably at a ratio of 0.60 to 1.00 mole, and more preferably at a ratio of 0.70 to 1.00 mole, with respect to 1 mole of a total of a diol component and a dicarboxylic acid component. By adjusting this molar ratio, the molecular weight of the polyester carbonate resin is controlled.

Examples of the basic compound catalyst may include an alkali metal compound, an alkaline-earth metal compound, and a nitrogen-containing compound.

Examples of the alkali metal compound used in the present invention may include the organic acid salts, inorganic salts, oxides, hydroxides, hydrides or alkoxides of alkali metals. From the viewpoints of catalytic effects, costs, distribution amount, the influence of the resin on hue, etc., sodium carbonate and sodium hydrogen carbonate are preferable.

Examples of the alkaline-earth metal compound may include the organic acid salts, inorganic salts, oxides, hydroxides, hydrides or alkoxides of the alkaline-earth metal compounds.

Examples of the nitrogen-containing compound may include quaternary ammonium hydroxides and the salts thereof, and amines.

As transesterification catalysts, the salts of zinc, tin, zirconium, and lead are preferably used, and these salts can be used alone or in combination thereof. In addition, the transesterification catalyst may also be used in combination with the aforementioned alkali metal compound or alkaline-earth metal compound.

Specific examples of the transesterification catalyst used herein may include zinc acetate, zinc benzoate, zinc 2-ethylhexanoate, tin(II) chloride, tin(IV) chloride, tin(II) acetate, tin(IV) acetate, dibutyltin dilaurate, dibutyltin oxide, dibutyltin dimethoxide, zirconium acetylacetonate, zirconium oxyacetate, zirconium tetrabutoxide, lead(II) acetate, lead(IV) acetate, zirconium acetate, and titanium tetrabutoxide. Among others, zinc acetate, zirconium acetate and titanium tetrabutoxide are preferable, and titanium tetrabutoxide is more preferable.

Such a catalyst is used at a ratio of $1\times10^{-9}$ to $1\times10^{-3}$ moles, and preferably at a ratio of $1\times10^{-7}$ to $1\times10^{-4}$ moles, with respect to 1 mole of a total of diol compounds.

In the melt polycondensation method, the above-described raw materials or catalysts are used, and melt polycondensation is carried out under heating under ordinary pressure or reduced pressure, while removing by-products according a transesterification reaction.

Specifically, the reaction is carried out at a temperature of 120° C. to 260° C., preferably of 180° C. to 260° C., for 0.1 to 5 hours, preferably for 0.5 to 3 hours. Subsequently, the reaction temperature is increased while the degree of pressure reduction in the reaction system is increased, so that the reaction of a diol compound with a carbonic acid diester is carried out, and finally, the polycondensation reaction is carried out under a reduced pressure of 1 mmHg or less at a temperature of 200° C. to 350° C. for 0.05 to 2 hours. Such a reaction may be carried out either in a continuous system or in a batch system. The reaction apparatus used to perform the above-described reaction may be a vertical reaction apparatus equipped with an anchor-type impeller, a max-blend impeller, a helical ribbon-type impeller, etc., or a horizontal reaction apparatus equipped with paddle blades, lattice blades, glasses blades, etc., or further, an extruder-type reaction apparatus equipped with a screw, etc. Moreover, a reaction apparatus prepared by appropriately combining the aforementioned reaction apparatuses with one another, while considering the viscosity of a polymer, is preferably used.

In the method for producing the polyester carbonate resin of the present invention, after completion of the polymerization reaction, in order to maintain heat stability and hydrolytic stability, the catalyst may be removed or deactivated. In general, a method of deactivating a catalyst by addition of a known acidic substance is preferably applied. Specific examples of these acidic substances that are preferably used herein may include: esters such as butyl benzoate; aromatic sulfonic acids such as p-toluenesulfonic acid; aromatic sulfonic acid esters, such as butyl p-toluenesulfonate and hexyl p-toluenesulfonate; phosphoric acids, such as phosphorous acid, phosphoric acid, and phosphonic acid; phosphorous acid esters, such as triphenyl phosphite, monophenyl phosphite, diphenyl phosphite, diethyl phosphite, di-n-propyl phosphite, di-n-butyl phosphite, di-n-hexyl phosphite, dioctyl phosphite, and monooctyl phosphite; phosphoric acid esters, such as triphenyl phosphate, diphenyl phosphate, monophenyl phosphate, dibutyl phosphate, dioctyl phosphate, and monooctyl phosphate; phosphonic acids, such as diphenyl phosphonate, dioctyl phosphonate, and dibutyl phosphonate; phosphonic acid esters such as diethyl phenyl phosphonate; phosphines, such as triphenylphosphine and bis(diphenylphosphino)ethane; boric acids, such as boric acid and phenyl borate; aromatic sulfonates, such as tetrabutylphosphonium dodecylbenzenesulfonate; organic halides, such as chloride stearate, benzoyl chloride, and p-toluenesulfonyl chloride; alkyl sulfates such as dimethyl sulfonate; and organic halogenates such as benzyl chloride. From the viewpoints of deactivating effects, and the hue and stability of the resin, butyl p-toluenesulfonate is preferably used. Such a deactivating agent is used in an amount of 0.01 to 50 times moles, and preferably 0.3 to 20 times moles, with respect to the amount of the catalyst. If the amount of the deactivating agent is smaller than 0.01 time mole with respect to the amount of the catalyst, deactivating effects unfavorably become insufficient. On the other hand, if the amount of the deactivating agent is larger than 50 times moles with respect to the amount of the catalyst, it is unfavorable that heat resistance is decreased and the molded body is easily colored.

After deactivation of the catalyst, a step of removing a low-boiling-point compound from the polymer by devolatilization at a pressure of 0.1 to 1 mmHg and at a temperature of 200° C. to 350° C. may be established. For this step, a horizontal apparatus equipped with stirring blades having excellent surface renewal ability, such as paddle blades, lattice blades or glasses blades, or a thin film evaporator is preferably used.

The polyester carbonate resin of the present invention is desired to contain a foreign matter in an amount as small as possible, and thus, filtration of melted raw materials and filtration of a catalyst solution are preferably carried out. The thickness of a filter mesh is preferably 5 μm or less, and more preferably 1 μm or less. Moreover, filtration of the generated resin through a polymer filter is preferably carried out. The thickness of the polymer filter mesh is preferably 100 μm or less, and more preferably 30 μm or less. Furthermore, a step of collecting resin pellets must be naturally performed under a low-dust environment, and the class is preferably 1000 or less, and more preferably 100 or less.

Besides, the polyester carbonate that satisfies the requirements of the present invention may be mixed with the polycarbonate having any structure shown in the aforementioned general formulae (4) to (6).

For example, the polyester carbonate obtained in Example 1 described later (polyester carbonate), and polycarbonate obtained by reacting 9,9-bis(4-(2-hydroxyethoxy)phenyl) fluorene (BPEF) with diphenyl carbonate (DPC), may be each polymerized, and thereafter, both of the resultants may be mixed with each other. Examples of the mixing method may include known melt kneading and a method comprising dissolving each of the polyester polycarbonate and the polycarbonate in an organic solvent such as chloroform, and then mixing the obtained solutions with each other.

(D) Physical Properties of Polyester Carbonate Resin

The polyester carbonate resin of the present invention is excellent in at least one of orientation birefringence, photoelastic coefficient, glass transition temperature, and refractive index.

The glass transition temperature (Tg) of the polyester carbonate resin of the present invention is preferably 95° C. to 180° C., more preferably 110° C. to 160° C., and particularly preferably 120° C. to 160° C. The lower limit of the glass transition temperature (Tg) is preferably 130° C., whereas the upper limit of the glass transition temperature (Tg) is preferably 150° C. If Tg is lower than 95° C., the operating temperature range of lenses or cameras is unfavorably narrowed. On the other hand, if Tg exceeds 180° C., molding conditions for injection molding are unfavorably restricted.

The refractive index of the polyester carbonate resin of the present invention measured after molding according to the method of JIS-K-7142 is preferably 1.50 to 1.65, and more preferably 1.52 to 1.59.

The Abbe number of the polyester carbonate resin of the present invention measured after molding according to the method of JIS-K-7142 is 25 or greater, preferably 40 or greater, and more preferably 50 or greater. The upper limit of the Abbe number is approximately 60.

The oriented refractive index of the polyester carbonate resin of the present invention measured using an ellipsometer is preferably 1 to 150 nm, more preferably 2 to 13 nm, and particularly preferably 2 to 9 nm.

Further, the photoelastic coefficient of the polyester carbonate resin of the present invention measured using an ellipsometer is preferably $10\times10^{-12}$ to $30\times10^{-12}$ Pa$^{-1}$, and more preferably $12\times10^{-12}$ to $18\times10^{-12}$ Pa$^{-1}$.

(E) Optical Lens

The optical lens of the present invention can be obtained by injection molding the aforementioned polyester carbonate resin of the present invention, using an injection molding machine or an injection compression molding machine, into the shape of a lens. Molding conditions for the injection molding are not particularly limited, but the molding temperature is preferably 180° C. to 280° C. In addition, the injection pressure is preferably 50 to 1700 kg/cm$^2$.

In order to avoid the mixing of foreign matters into the optical lens, the molding environment must be naturally a low-dust environment, and the class is preferably 1000 or less, and more preferably 100 or less.

The optical lens of the present invention is preferably used in the shape of an aspherical lens, as necessary. Since the aspherical lens can reduce spherical aberration to substantially zero with a single lens thereof, it is not necessary to eliminate the spherical aberration by a combination of a plurality of spherical lenses, and thereby, it becomes possible to achieve weight saving and a reduction in production costs. Therefore, among the optical lenses, the aspherical lens is particularly useful as a camera lens. The astigmatism of the aspherical lens is preferably 0 to 15 mλ, and more preferably 0 to 10 mλ.

The thickness of the optical lens of the present invention can be set to be in a wide range depending on intended use, and is not particularly limited. The thickness of the present optical lens is preferably 0.01 to 30 mm, and more preferably 0.1 to 15 mm. A coating layer, such as an antireflection layer or a hard coating layer, may be established on the surface of the optical lens of the present invention, as necessary. The antireflection layer may be either a single layer or a multilayer, or may also be either an organic matter or an inorganic matter. The antireflection layer is preferably an inorganic matter. Specific examples may include oxides or fluorides, such as silicon oxide, aluminum oxide, zirconium oxide, titanium oxide, cerium oxide, magnesium oxide, or magnesium fluoride. Among these, silicon oxide and zirconium oxide are more preferable, and a combination of silicon oxide and zirconium oxide is further preferable. Moreover, the antireflection layer is not particularly limited in terms of a combination of a single layer/a multilayer, components constituting the layers, a combination of the thicknesses of the layers, etc. Two-layer configuration or three-layer configuration is preferable, and three-layer configuration is particularly preferable. Furthermore, the antireflection layer as a whole may be formed to a thickness that is 0.00017% to 3.3%, based on the thickness of the optical lens, and specifically, to a thickness of 0.05 to 3 μm, and particularly preferably 1 to 2 μm.

EXAMPLES

Hereinafter, the present invention will be described in the following examples. However, these examples are not intended to limit the scope of the present invention. It is to be noted that the measurement values described in the examples were obtained by applying the following methods or apparatuses.

<Method of Measuring Weight Average Molecular Weight (Mw)>

The weight average molecular weight relative to polystyrene standard was obtained from the calibration curve of previously produced standard polystyrene. That is to say, standard polystyrene (manufactured by Tosoh Corporation, "PStQuick MP-M") whose molecular weight had been known (molecular weight distribution=1) was used to produce a standard curve. From the measured standard polystyrene, the elution time and the molecular weight value of each peak were plotted, and approximation was performed with a cubic equation to obtain a calibration curve. Mw was obtained according to the following equation:

$$Mw=\Sigma(Wi\times Mi)/\Sigma(Wi).$$

In this equation, i indicates an i$^{th}$ dividing point when the molecular weight M was divided; Wi indicates an i$^{th}$ weight; and Mi indicates an i$^{th}$ molecular weight. Moreover, the molecular weight M indicates the value of the molecular weight of polystyrene at the same elution time in the calibration curve. As a GPC apparatus, HLC-8320GPC manufactured by Tosoh Corporation was used. A single column of TSKguardcolumn SuperMPHZ-M was used as a guard column, and a TSKgel SuperMultiporeHZ-M column line consisting of three columns connected in series was used as an analysis column. Other conditions are as follows.

Solvent: Tetrahydrofuran, HPLC grade
Amount injected: 10 μL
Sample concentration: 0.2 w/v % Chloroform solution, HPLC grade
Solvent flow rate: 0.35 ml/min
Measurement temperature: 40° C.
Detector: RI <Glass Transition Temperature (Tg)>

The glass transition temperature (Tg) was measured in accordance with JIS K7121-1987, using a differential scanning calorimeter (DSC). As the analyzer, Hitachi High-Tech Science X-DSC7000 was used.

<Oriented Refractive Index>

The obtained polyester carbonate resin was heated to the Tg of the resin +65° C., and the resulting resin was then pressed using a pressing machine (100 kgf/cm$^2$, 2 minutes) to produce a sheet. The produced sheet was subjected to uniaxial extension to an extension magnification of 1.5 times at the Tg of the resin +20° C., and the phase difference at 600 nm was then measured using M-220 manufactured by JASCO Corporation.

<Photoelastic Coefficient>

The obtained polyester carbonate resin was heated to the Tg of the resin +65° C., and the resulting resin was then pressed using a pressing machine (100 kgf/cm$^2$, 2 minutes) to produce a sheet. The produced sheet was subjected to uniaxial extension to an extension magnification of 1.5 times at the Tg of the resin +20° C., and the measurement was then carried out using M-220 manufactured by JASCO Corporation.

<Refractive Index>

The obtained polyester carbonate resin was press-molded into a disk having 40 φ and a thickness of 3 mm according to press molding (molding conditions: 200° C., 100 kgf/cm$^2$, and 2 minutes), and was then cut at a right angle, which was then measured using KPR-200 manufactured by Kalnew.

Example 1

D-NDM represented by the following structural formula (200.00 g; 0.900 moles), 9,9-fluorene-methyl dipropionate (FDPM) represented by the following structural formula (66.67 g; 0.197 moles), diphenyl carbonate (155.00 g; 0.724 moles), and titanium tetrabutoxide (29.1 mg; 8.6×10$^{-5}$ moles), which were used as raw materials, were placed in a 500 mL reactor equipped with a stirrer and a distillation apparatus. Thereafter, the obtained mixture was heated to 180° C. in a nitrogen atmosphere at a pressure of 101.3 kPa over 1 hour, and was stirred. After the temperature had reached 180° C., the pressure was reduced to 40 kPa over 30 minutes. After initiation of the pressure reduction, the temperature was increased to 255° C. over 2 hours. When the distilled methanol and the distilled phenol became 60%, the pressure was further reduced to 0.133 kPa or less over 1 hour. The reaction mixture was retained at a pressure of 0.133 kPa or less for 30 minutes to obtain a polyester carbonate resin.

The physical properties of the obtained polyester carbonate resin are shown in Table 1.

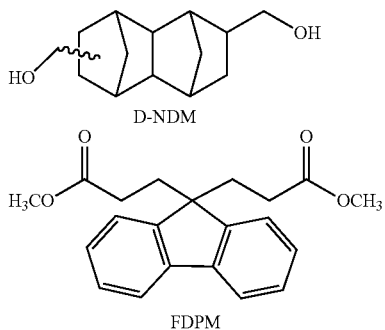

Example 2

A polyester carbonate resin was obtained by performing the same operations as those in Example 1, with the exception that the aforementioned D-NDM (185.11 g; 0.833 moles), 9,9-bis(4-(2-hydroxyethoxy)phenyl)fluorene (BPEF) represented by the following structural formula (26.45 g; 0.060 moles), the aforementioned FDPM (52.90 g; 0.156 moles), diphenyl carbonate (163.40 g; 0.763 moles), and titanium tetrabutoxide (19.4 mg; 5.8×10$^{-5}$ moles) were used as raw materials.

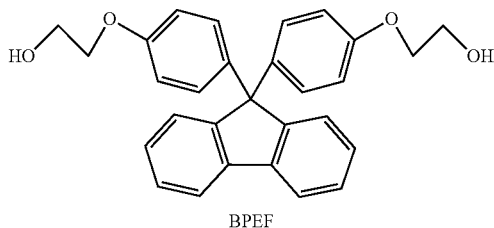

Example 2-1

A polyester carbonate resin was obtained by performing the same operations as those in Example 1, with the exception that the aforementioned D-NDM (135.00 g; 0.607 moles), the aforementioned BPEF (110.00 g; 0.251 moles), the aforementioned FDPM (52.90 g; 0.156 moles), diphenyl carbonate (163.40 g; 0.763 moles), and titanium tetrabutoxide (19.4 mg; 5.8×10$^{-5}$ moles) were used as raw materials.

Example 2-2

A polyester carbonate resin was obtained by performing the same operations as those in Example 1, with the exception that the aforementioned D-NDM (140.00 g; 0.630 moles), the aforementioned BPEF (20.00 g; 0.046 moles), the aforementioned FDPM (100.00 g; 0.296 moles), diphenyl carbonate (163.40 g; 0.763 moles), and titanium tetrabutoxide (19.4 mg; 5.8×10$^{-5}$ moles) were used as raw materials.

Example 3

A polyester carbonate resin was obtained by performing the same operations as those in Example 1, with the exception that the aforementioned D-NDM (185.11 g; 0.833 moles), 9,9-bis(4-(2-hydroxyethoxy)-3-phenylphenyl)fluorene (BPPEF) represented by the following structural formula (35.63 g; 0.060 moles), the aforementioned FDPM (52.90 g; 0.156 moles), diphenyl carbonate (163.40 g; 0.763 moles), and titanium tetrabutoxide (19.4 mg; 5.8×10$^{-5}$ moles) were used as raw materials.

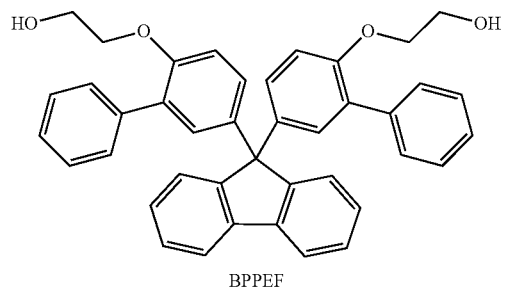

Example 4

A polyester carbonate resin was obtained by performing the same operations as those in Example 1, with the exception that the aforementioned D-NDM (185.11 g; 0.833 moles), 2,2'-bis(2-hydroxyethoxy)-1,1'-binaphthalene (BNE) represented by the following structural formula (22.60 g; 0.060 moles), the aforementioned FDPM (52.90 g; 0.156 moles), diphenyl carbonate (163.40 g; 0.763 moles), and titanium tetrabutoxide (19.4 mg; 5.8×10$^{-5}$ moles) were used as raw materials.

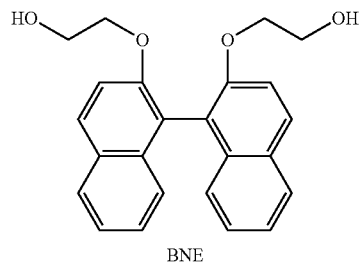 [SMILES: OCCOc1ccc2ccccc2c1-c1c(OCCO)ccc2ccccc12]

Example 5

A polyester carbonate resin was obtained by performing the same operations as those in Example 1, with the exception that the aforementioned D-NDM (200.00 g; 0.900 moles), dimethyl terephthalate (DMT) represented by the following structural formula (38.26 g; 0.197 moles), diphenyl carbonate (155.00 g; 0.724 moles), and titanium tetrabutoxide (19.4 mg; $5.8 \times 10^{-5}$ moles) were used as raw materials.

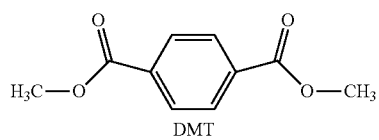

DMT

Comparative Example 1

The same operations as those in Example 1 were performed, with the exception that the aforementioned D-NDM (200.00 g; 0.900 moles), diphenyl carbonate (220.00 g; 1.027 moles), and sodium hydrogen carbonate (1.3 mg; 15.0 µmoles) were used as raw materials.

Comparative Example 2

The same operations as those in Example 1 were performed, with the exception that the aforementioned D-NDM (170.00 g; 0.765 moles), the aforementioned BPEF (60.00 g; 0.137 moles), diphenyl carbonate (220.00 g; 1.027 moles), and sodium hydrogen carbonate (1.3 mg; 15.0 µmoles) were used as raw materials.

When the results of Example 1 were compared with the results of Example 5, the oriented refractive index and the photoelastic coefficient became higher values in Example 5 using dimethyl terephthalate (DMT), than in Example 1 using fluorene dimethyl dipropionate (FDPM). However, dimethyl terephthalate (DMT) is advantageous in that it is more expensive than fluorene dimethyl dipropionate (FDPM). Hence, the polyester carbonate resin obtained in Example 5 may be mixed into the polyester carbonate resin obtained in Example 1, and the thus mixed resin may be used. Naturally, the polyester carbonate resin obtained in Example 5 may also be used alone.

The invention claimed is:

1. A polyester carbonate resin comprising a constituent unit represented by the following general formula (1), a constituent unit represented by the following general formula (2), and a constituent unit represented by the following general formula (3):

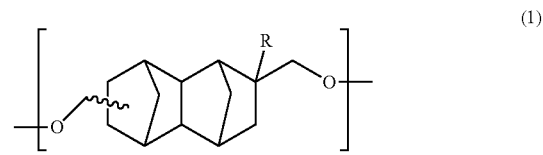

(1)

wherein R represents hydrogen or an alkyl group containing 1 to 4 carbon atoms,

TABLE 1

|  |  |  | Ex. 1 | Ex. 2 | Ex. 2-1 | Ex. 2-2 | Ex. 3 |
|---|---|---|---|---|---|---|---|
| Composition ratio of raw materials | D-NDM | mol % | 82 | 79 | 60 | 65 | 79 |
|  | BPEF | mol % | 0 | 6 | 25 | 5 | 0 |
|  | BPPEF | mol % | 0 | 0 | 0 | 0 | 6 |
|  | BNE | mol % | 0 | 0 | 0 | 0 | 0 |
|  | FDPM | mol % | 18 | 15 | 15 | 30 | 15 |
|  | DMT | mol % | 0 | 0 | 0 | 0 | 0 |
| Physical properties | Orientation birefringence | nm | 13 | 8 | 2 | 2 | 8 |
|  | Photoelastic coefficient | $\times 10^{-12} \cdot Pa^{-1}$ | 12 | 14 | 18 | 15 | 16 |
|  | Tg | ° C. | 132 | 135 | 138 | 131 | 137 |
|  | Mw | — | 38000 | 45000 | 40000 | 42000 | 42000 |
|  | Refractive index | nd | 1.550 | 1.555 | 1.583 | 1.566 | 1.558 |

|  |  |  | Ex. 4 | Ex. 5 | Comp. Ex. 1 | Comp. Ex. 2 |
|---|---|---|---|---|---|---|
| Composition ratio of raw materials | D-NDM | mol % | 79 | 82 | 100 | 85 |
|  | BPEF | mol % | 0 | 0 | 0 | 15 |
|  | BPPEF | mol % | 0 | 0 | 0 | 0 |
|  | BNE | mol % | 6 | 0 | 0 | 0 |
|  | FDPM | mol % | 15 | 0 | 0 | 0 |
|  | DMT | mol % | 0 | 18 | 0 | 0 |
| Physical properties | Orientation birefringence | nm | 9 | 150 | 120 | 55 |
|  | Photoelastic coefficient | $\times 10^{-12} \cdot Pa^{-1}$ | 17 | 25 | 8 | 15 |
|  | Tg | ° C. | 131 | 138 | 135 | 136 |
|  | Mw | — | 40000 | 39000 | 37000 | 37000 |
|  | Refractive index | nd | 1.559 | 1.540 | 1.531 | 1.558 |

(2)

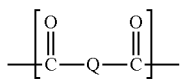

wherein Q represents the following:

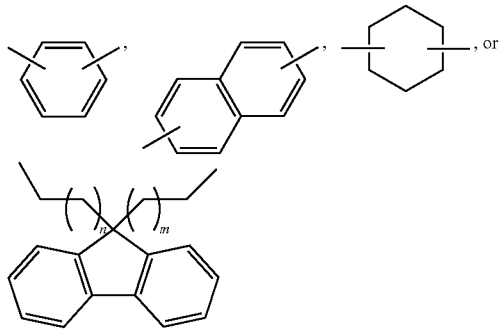

wherein n and m each independently represent an integer of 0 to 5, and (3)

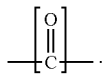

2. The polyester carbonate resin according to claim 1, further comprising a constituent unit represented by the following general formula (4):

(4)

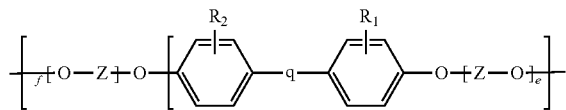

wherein q represents the following, and $R_1$ and $R_2$ each independently represent hydrogen, a methyl group, or an aryl group, Z represents an alkylene group containing 1 to 8 carbon atoms, and e and f each independently represent an integer of 0 to 10,

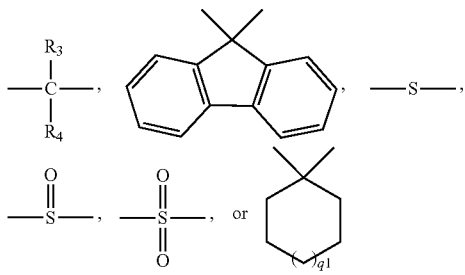

wherein $R_3$ and $R_4$ each independently represent hydrogen, an optionally branched alkyl group containing 1 to 5 carbon atoms, or an aryl group, and q1 represents an integer of 1 to 12.

3. The polyester carbonate resin according to claim 1, further comprising a constituent unit represented by the following general formula (5):

(5)

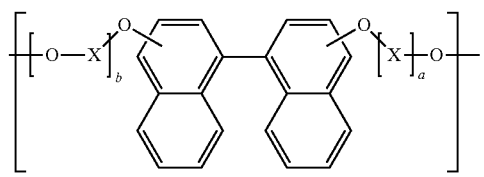

wherein X represents an alkylene group containing 1 to 8 carbon atoms, and a and b each independently represent an integer of 0 to 10.

4. The polyester carbonate resin according to claim 1, further comprising a constituent unit represented by the following general formula (6):

(6)

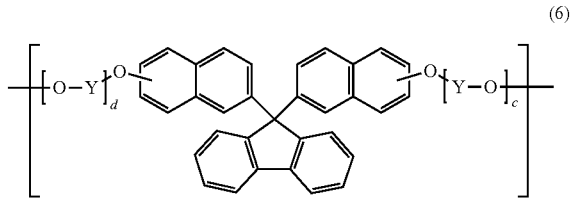

wherein Y represents an alkylene group containing 1 to 8 carbon atoms, and c and d each independently represent an integer of 0 to 10.

5. An optical lens, in which the polyester carbonate resin according to claim 1 is used.

6. The polyester carbonate resin according to claim 2, further comprising a constituent unit represented by the following general formula (5):

(5)

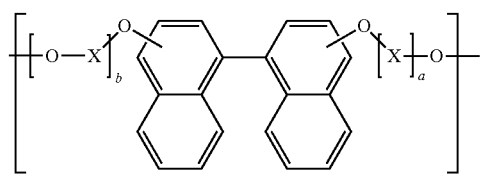

wherein X represents an alkylene group containing 1 to 8 carbon atoms, and a and b each independently represent an integer of 0 to 10.

7. The polyester carbonate resin according to claim 2, further comprising a constituent unit represented by the following general formula (6):

(6)

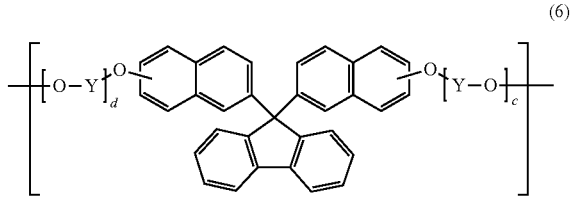

wherein Y represents an alkylene group containing 1 to 8 carbon atoms, and c and d each independently represent an integer of 0 to 10.

\* \* \* \* \*